United States Patent

Maxted

[11] 4,039,074
[45] Aug. 2, 1977

[54] UNSCRAMBLER FOR RANDOMLY ARRANGED PACKAGES

[75] Inventor: Wesley R. Maxted, Grand Rapids, Mich.

[73] Assignee: Rapistan, Incorporated, Grand Rapids, Mich.

[21] Appl. No.: 628,957

[22] Filed: Nov. 5, 1975

[51] Int. Cl.² ............................................. B65G 47/26
[52] U.S. Cl. ................................. 198/456; 198/786
[58] Field of Search ............... 198/30, 32, 127 R, 282, 198/286, 416, 785, 786, 443, 456, 780, 417

[56] References Cited

U.S. PATENT DOCUMENTS

| 1,487,000 | 3/1924 | Williams | 198/416 |
| 2,848,096 | 8/1958 | Luginbuhl | 198/30 |
| 3,420,354 | 1/1969 | Gardiner | 198/282 |
| 3,458,026 | 7/1969 | Lauzon | 198/34 |
| 3,485,339 | 12/1969 | Miller et al. | 198/34 |
| 3,570,649 | 3/1971 | Fluck | 198/34 |
| 3,601,240 | 8/1971 | Dominici | 198/20 |
| 3,666,077 | 5/1972 | Marshall | 198/29 |
| 3,866,739 | 2/1975 | Sikorski | 198/30 |
| 3,895,706 | 7/1975 | Levin et al. | 198/32 X |

Primary Examiner—Evon C. Blunk
Assistant Examiner—Douglas D. Watts
Attorney, Agent, or Firm—Price, Heneveld, Huizenga & Cooper

[57] ABSTRACT

An unscrambler for randomly arranged cartons includes a power driven conveyor bed having a plurality of separately driven roller sections. The sections are driven at progressively greater speeds from the receiving end to the discharge end. The interface between adjacent sections is along a split line extending at an acute angle relative to the sides of the conveyor bed. Each roller is skewed at an angle relative to the bed frame. A guard rail having a high friction surface extends parallel to the sides of the bed and includes an offset adjacent the last split line.

8 Claims, 4 Drawing Figures

U.S. Patent　　Aug. 2, 1977　　4,039,074
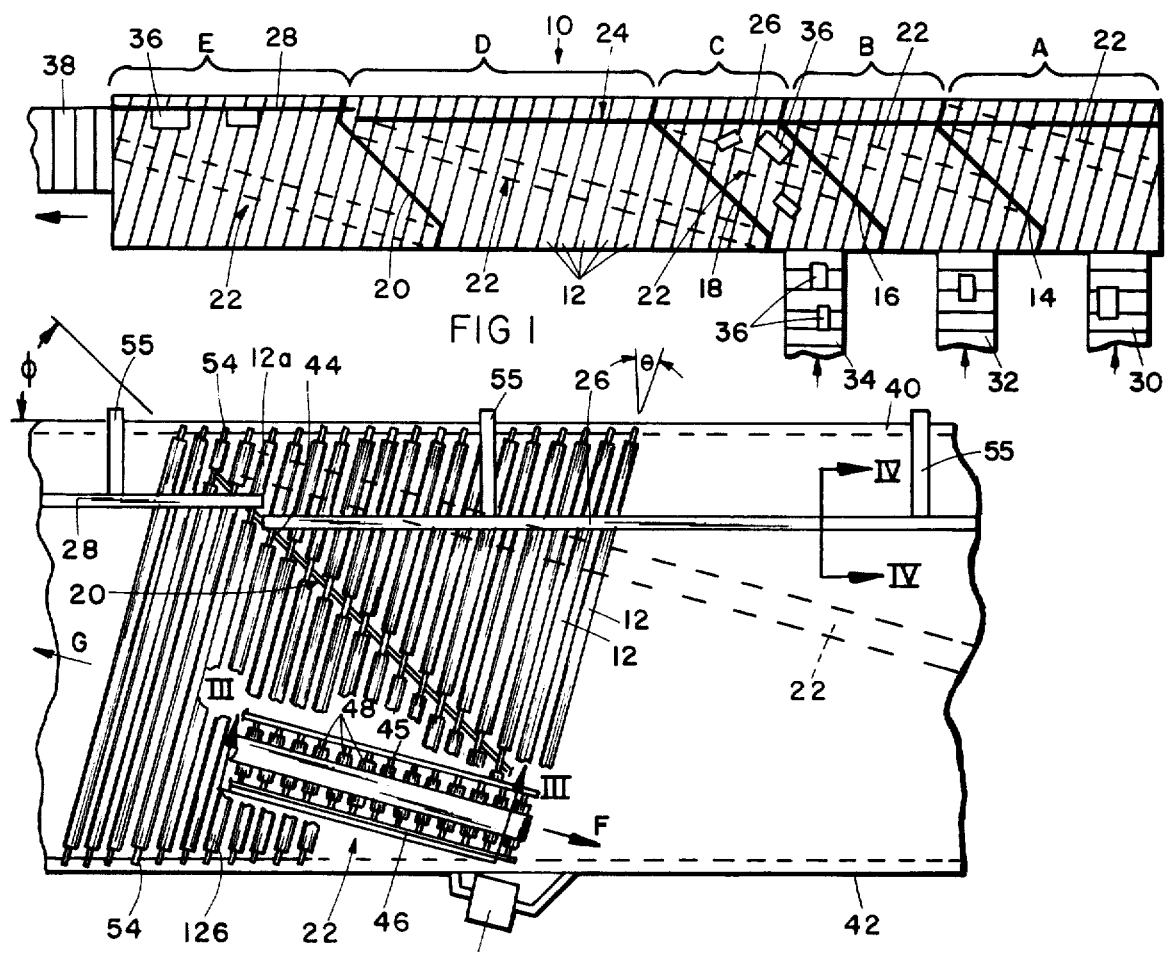
FIG 1
FIG 2
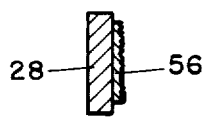
FIG 4
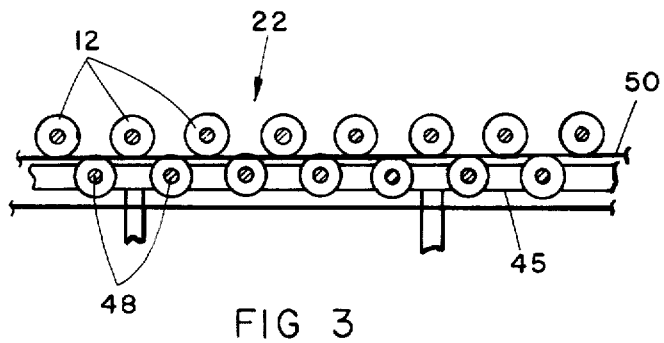
FIG 3

4,039,074

UNSCRAMBLER FOR RANDOMLY ARRANGED PACKAGES

BACKGROUND OF THE INVENTION

This invention relates to conveyors, and more particularly, it concerns power driven roller conveyors for unscrambling randomly arranged cartons, aligning the cartons in single file and orienting the cartons along their long axes.

A variety of unscrambler type conveyor systems are presently known. These unscramblers generally arrange randomly received cartons in single file prior to delivery to a take-off conveyor. For example, U.S. Pat. No. 3,866,739 to Sikorski, entitled FREE FLOW DEVICE FOR CONTAINER UNSCRAMBLERS, issued on Feb. 18, 1975 discloses an unscrambling device including a plurality of longitudinally extending conveyor belts and an angled oscillating shunting bar. Adjacent belts are driven at progressively increasing speeds to assist in separation of the randomly oriented containers. Further, the shunting bar extends across the belts at an acute angle relative to the unscrambler frame. As a result, the containers are driven into the shunting bar. The shunting bar directs the containers towards one side of the unscrambler to the outermost take-off belt. Should packages be placed on the unscrambler at too fast a rate, they will tend to jam up in the reduced area at the take-off conveyor. Oscillation of the shunting bar is necessary to jog the containers in an attempt to prevent such jamming.

Another prior unscrambler arrangement includes an elongated bed of power driven rollers. The bed is divided into a plurality of roller sections, with the roller sections being driven at a progressively greater speed from the receiving end to the discharge end. The interface between a pair of these sections is along an acute angle and is defined by a plurality of split rollers. A guard rail extends from one side of the conveyor bed inwardly at an acute angle opposite the direction of conveyor flow as in the Sikorski arrangement. Packages are deposited at one end of the unscrambler in a random fashion. As the packages pass over the interface they are separated and driven into the angled guard rail. The guard rail decelerates each package which comes in contact therewith and rotates it until it rests against the guard rail with the long axis in the direction of movement. This arrangement is subject to jamming at the reduced area where the packages or cartons are taken off the unscrambler. Angling of the guard rail relative to the conveyor bed results in a large area of the conveyor bed being totally unused for unscrambling or conveying purposes. This in conjunction with the angled guard rail reduces or limits the maximum rate at which packages may be randomly deposited on the unscrambler. Further, if a leading package is not adequately separated, it may hang up on a trailing package. The packages would then leave the conveyor in this condition which is not the desired, spaced, tandem orientation.

SUMMARY OF THE INVENTION

In accordance with the present invention an improved unscrambler is provided by which the problems heretofore experienced with prior systems are substantially eliminated. Essentially, the unscrambler for randomly arranged packages includes a power driven conveyor bed having a plurality of separately driven sections or roller groups. The interface between adjacent sections is along a split line, extending at an acute angle relative to the sides of the conveyor bed. The roller sections are driven at progressively greater speeds from the receiving end to the discharge end. A guard rail having a high friction surface is provided along and extends parallel to the side of the conveyor bed toward which the split converges downstream of the movement of the articles. Provision is made to prevent packages from hanging up on each other and to insure package separation. Each roller is skewed at a slight angle relative to the sides of the conveyor bed. This angle is such that the axes or the rollers converge toward the guard rail upstream of the movement of the articles. This canting of the rollers urges randomly deposited packages toward and against the guard rail. The structural arrangement assures separation of randomly deposited packages, arrangement of the packages in single file, and orientation of each package with its long axis parallel to the direction of movement.

BRIEF DESCRIPTION OF THE DRAWINGS

FIG. 1 is a schematic, plan view of an unscrambler in accordance with the present invention;

FIG. 2 is a fragmentary plan view of a portion of the unscrambler of FIG. 1;

FIG. 3 is a sectional view taken along line III—III of FIG. 2; and

FIG. 4 is a cross sectional view taken along line IV—IV of FIG. 2.

DETAILED DESCRIPTION OF THE PREFERRED EMBODIMENT

With reference to FIG. 1, an unscrambler for randomly arranged packages in accordance with the present invention is illustrated and generally designated 10. The unscrambler 10 is divided into a plurality of sections designated A, B, C, D, and E. Each section includes a plurality of parallel, coplanar rollers 12. As shown, each roller 12 is skewed at an angle $\theta$ relative to the sides of unscrambler 10 (FIG. 2). The sections A-E interface along split lines 14, 16, 18 and 20. The split lines 14–20 extend across the unscrambler 10 at an acute angle $\phi$ relative to the sides thereof in the direction of container movement (FIG. 2). Each roller section is powered by a drive belt arrangement 22.

A guard rail or decelerator 24 extends the length of the unscrambler 10. As shown, the guard rail 24 includes two sections 26 and 28. Both sections 26 and 28 extend parallel to and adjacent the edge of the unscrambler 10. The section 28, however, is positioned closer to the lateral edge of the unscrambler and is therefore offset slightly from the section 26.

Infeed conveyors 30, 32 and 34 deposit packages 36 onto conveyor sections A, B, and C, respectively of the unscrambler. More or less infeed sections can be utilized, the number shown being illustrative only. The infeed conveyors need not deposit packages onto separate unscrambler sections. A single infeed conveyor could be provided or a plurality could discharge packages onto the first section. The specific arrangement selected would be dependent upon the overall dimensions of the unscrambler and the operating speeds of the various roller sections.

A take-off conveyor 38 extends longitudinally from the outlet end of the unscrambler 10 and receives unscrambled packages.

With reference to FIGS. 2, 3 and 4, the details of the unscrambler schematically illustrated in FIG. 1 will now be more fully described. As shown in FIG. 2, the unscrambler 10 includes a pair of spaced side channels 40 and 42. Extending between the side channels 40 and 42 and skewed with respect thereto are rollers 12. The skew or cant angle $\theta$ of each roller is such that the axes of the rollers converge toward the guard rail. The rollers, therefore, convey or urge the packages against the guard rail.

The interface between sections D and E at the split line 20, as shown in FIG. 2, is formed by a plurality of two piece or split rollers having sections 12a and 12b. These split rollers include a common axle 44 and each roller section or portion 12a and 12b is dimensioned so that the split line extends across the unscrambler bed at an acute angle $\phi$ in the direction of roller convergence. All of the split lines are at an acute angle relative to the side members and converge toward the guard rail in the direction of article or package movement.

Roller section E is driven by a drive belt arrangement 22 at a speed which is greater than that of roller section D. The drive arrangement 22, as best seen in FIGS. 2 and 3, includes a pair of side channel members 45 and 46. Extending between the side channel members 45 and 46 are a plurality of pressure rollers 48. As shown, the pressure rollers 48 are positioned below and between adjacent carrier rollers 12. A drive belt 50 extends over the pressure rollers 46 and contacts the under surface of each carrier roller 12. The drive belt 50 is driven by a suitable motor 52 which may be of the electric, hydraulic, or pneumatic type. Alternatively, a single power source could be employed to drive each roller section at a different speed through a suitable speed reducer arrangement.

Each carrier roller 12 may have its axle received within a slot 54 formed in side channel members 40 and 42. As a result, each carrier roller 12 is free to float in a vertical plane. As packages 36 pass over the carrier rollers 12, their weight exerts a downward pressure on the rollers so that they increasingly engage the drive belt 50 to be rotated thereby. As shown, the belt 50 moves in the direction of arrow F resulting in conveyance of packages on the carrier rollers in the direction of arrow G.

The guard rail or decelerator 24 is mounted by suitable brackets 55 so as to extend longitudinally of and parallel to the side channel 40. As shown in FIG. 2, guard rail section 28 is positioned closer to the side rail member 40 than the guard rail section 26. This offset occurs adjacent final roller sections D and E at the split line 20. Each guard rail section 26 and 28, as best seen in FIG. 4, has attached to its face a carbide type, abrasive, friction strip 56. This abrasive strip 56 may be of any material having a relatively high coefficient of friction such as that sold by the 3M Company under the trademark SCOTCH TREAD ABRASIVE TAPE. The abrasive strip 56 serves to decelerate packages moving across the unscrambler to thereby cause the packages to rotate about their vertical axes until their long axes are parallel to the guard rail. By decelerating each package as it moves down the unscrambler, the abrasive strip also assists in separating the packages and placing them in single file. Further, the abrasive strip by increasing the drag imparted by the guard rail on each package, accelerates the turning action and thereby reduces the overall required length of the scrambler.

The overall operation of the unscrambler will now be described with reference to FIG. 1. As packages 36 are desposited onto sections A, B and C by infeed conveyors 30, 32 and 34 they are driven toward the guard rail 24 due to the canting of the rollers 12. As the randomly arranged packages approach a split line 16, 18 or 19, the package furthest from the guard rail 24 will be accelerated first as it passes into the next section. This action due to the speed differential of adjacent sections serves to separate the randomly disposed packages. As packages 36 contact the abrasive strip 56 on the face of the guard rail 24 they are decelerated and caused to rotate about their vertical axes. This rotation continues until each package 36 is oriented so that its longitudinal or long axis is parallel to the guard rail 24. The offset between guard rail sections 26 and 28 located adjacent the split line 20 functions to abruptly jog a package 36 as it passes across the interface between sections D and E. Should a pair of packages approach this interface or split line 20 with the trailing corner of the forward package hung up on the leading corner of the trailing package, this abrupt jogging or kicking action will separate or break loose the packages so that they will assume a tandem or one-to-one orientation. The amount of offset is determined empirically. It is preferred to position the offset at the last split line to take advantage of the speed differential across this interface. This differential increases the kicking action at the offset.

In one presently existing form of an unscrambler in accordance with the present invention, the overall length of the unscrambler is 60 feet with the width being 7 feet 8¼ inches. Each roller 12 is canted or skewed relative to the side frame 42 at an angle $\theta$ of 15° from vertical or 75° from horizontal. The split lines extend across the unscrambler at an angle $\phi$ of 45° in the direction of roller convergence. Section A is driven at a speed of 75 feet per minute, section B at a speed of 110 feet per minute, section C at a speed of 165 feet per minute, section D at a speed of 250 feet per minute, and section E at a speed of 375 feet per minute. With such an arrangement, packages may be discharged onto the unscrambler at a maximum rate of approximately 120 packages per minute.

By increasing the length of the conveyor, the efficiency of the unscrambler may be increased since package residence time would be increased. An increase in the operating speeds of each roller section with or without an increase in overall length would result in an increase in the capacity of the unscrambler. Further, the width of the conveyor may be varied to accommodate packages of different lengths. As the average package length decreases, the width may be decreased while maintaining unscrambler capacity. The important consideration being to provide sufficient bed space to handle relatively high ontake rates, while allowing the articles to contact the guard rail as soon as possible to initiate orientation action. Alternatively, as the average package length increases the width may be increased or the roller speeds may be increased to maintain capacity.

The overall structure arrangement of the present invention results in an unscrambler capable of handling a relatively high input rate while eliminating wasted conveyor space, any possibility of jamming, and insuring that the packages will leave the unscrambler in single file with their long axes parallel to the direction of package travel.

Various modifications may be made without departing from the scope of the present invention. For example, a portion of the last roller section opposite the guard rail may be eliminated since the packages travel through this section in single file. Also, the rollers may terminate at the guard rail thereby eliminating additional unused or wasted conveyor space. Both of these modifications could reduce overall manufacturing expense through a resultant savings in the cost of the rollers.

It can therefore be seen that the unscrambler for randomly arranged packages in accordance with the present invention is efficient, is capable of handling more packages per minute then unscramblers heretofore available and is free of jamming problems which result from directing packages to a relatively narrow outlet. As expressly intended, therefore, the foregoing description is illustrative of the preferred embodiment only. It is not to be considered limiting and the true spirit and scope of the present invention will be determined by reference to the appended claims.

The embodiments of the invention in which an exclusive property or privilege is claimed are defined as follows:

1. An unscrambler having a receiving end and a discharge end for arranging in tandem articles received in random orientation and spacing, comprising:
   spaced, parallel, longitudinally extending side members;
   a plurality of rollers extending between said side members, said rollers being coplanar and canted at a small angle relative to said side members so that the axes of said rollers converge towards one of said side members, said rollers lengthwise of said members being divided into a plurality of interfaced groups the interface between said groups being along a split line, said line being at an angle with respect to said side members;
   means for driving said roller groups, said driving means driving each group of rollers at a different speed, the speed of the roller groups increasing progressively from the receiving end to the discharge end of the conveyor; and
   a guard rail mounted parallel to one of said side members so that articles conveyed by said roller groups are urged into contact with said guard rail while they are in transit over the unscrambler, said guard rail including an abrasive strip secured to the surface contacted by said articles whereby the coefficient of friction of said surface is increased.

2. An unscrambler as defined by claim 1 wherein the interface between adjacent groups of said rollers is along a split line, said split line being at an acute angle relative to said side members and converging toward said guard rail in the direction of article movement.

3. An unscrambler as defined by claim 2 wherein said rollers are parallel to each other and said split lines are parallel to each other.

4. An unscrambler as defined by claim 2 wherein said guard rail comprises two sections, said sections being parallel to one another and offset laterally from one another adjacent the interface between the last of said roller groups.

5. An unscrambler having a receiving end and a discharge end for arranging in tandem articles received in random orientation and spacing, comprising:
   spaced, parallel, longitudinally extending side members;
   a plurality of rollers extending between said side members, said rollers being coplanar and canted at a small angle relative to said side members so that the axes of said rollers converge towards one of said side members, said rollers lengthwise of said side members being divided into a plurality of groups;
   means for driving said roller groups, said driving means driving each group of rollers at a different speed, the speed of the roller groups increasing progressively from the receiving end to the discharge end of the conveyor; and
   a guard rail mounted parallel to one of said side members so that articles conveyed by said roller groups are urged into contact with said guard rail while they are in transit over the unscrambler, wherein the interface between adjacent groups of said rollers is along a split line, said split line being at an acute angle relative to said side members and converging toward said guard rail in the direction of article movement, said guard rail further including a surface having a high coefficient of friction for decelerating articles contacting said surface, said rollers are parallel to each other and said split lines are parallel to each other, and wherein said rollers adjacent said split line each include a pair of separate roller portions, each portion of each roller being dimensioned so as to define said split line.

6. An unscrambler as defined by claim 5 wherein said guard rail comprises two sections, said sections being parallel to one another and offset from one another adjacent the interface between the last of said roller groups.

7. An unscrambler as defined by claim 6 wherein said rollers are canted at an angle of 15° relative to a line extending perpendicular to said side members.

8. An unscrambler as defined by claim 7 wherein said split lines are at an angle of 45° relative to a line extending perpendicular to said side members.

* * * * *